US010850844B2

(12) United States Patent
Corbett et al.

(10) Patent No.: US 10,850,844 B2
(45) Date of Patent: Dec. 1, 2020

(54) MOBILE PLATFORM CABIN CONFIGURED FOR PASSENGER AND CARGO TRANSPORT

(71) Applicant: DE HAVILLAND AIRCRAFT OF CANADA LIMITED, Toronto (CA)

(72) Inventors: Kent Corbett, Campbellville (CA); Stephen Mabee, Toronto (CA)

(73) Assignee: DE HAVILLAND AIRCRAFT OF CANADA LIMITED, Toronto (CA)

( * ) Notice: Subject to any disclaimer, the term of this patent is extended or adjusted under 35 U.S.C. 154(b) by 0 days.

(21) Appl. No.: 15/780,690

(22) PCT Filed: Nov. 25, 2016

(86) PCT No.: PCT/IB2016/057140
§ 371 (c)(1),
(2) Date: Jun. 1, 2018

(87) PCT Pub. No.: WO2017/093871
PCT Pub. Date: Jun. 8, 2017

(65) Prior Publication Data
US 2018/0346121 A1 Dec. 6, 2018

Related U.S. Application Data
(60) Provisional application No. 62/263,243, filed on Dec. 4, 2015.

(51) Int. Cl.
*B60P 7/08* (2006.01)
*B64D 9/00* (2006.01)
(Continued)

(52) U.S. Cl.
CPC ............ *B64D 9/003* (2013.01); *B60P 7/0876* (2013.01); *B60P 7/10* (2013.01); *B60P 7/14* (2013.01);
(Continued)

(58) Field of Classification Search
CPC ...... B64D 9/003; B64D 9/00; B64D 11/0023; B62D 33/04; B62D 33/0207;
(Continued)

(56) References Cited

U.S. PATENT DOCUMENTS 2,669,402 A 2/1954 Del Mar
3,897,919 A 8/1975 Weingarten
(Continued)

FOREIGN PATENT DOCUMENTS

DE 2913050 A1 10/1980
EP 0354403 A2 2/1990
(Continued)

OTHER PUBLICATIONS

PCT international Search Report and Written Opinion dated Feb. 10, 2017 re: International Application No. PCT/IB2016/057140.
(Continued)

*Primary Examiner* — Stephen T Gordon
(74) *Attorney, Agent, or Firm* — Bennett Jones LLP (57) ABSTRACT

The mobile platform cabin (20) disclosed herein comprises a passenger portion (22), a first cargo portion (24) disposed aft of the passenger portion (22), a partition (36) separating the passenger portion (22) from the first cargo portion (24), a second cargo portion (26) disposed aft of the first cargo portion (24) and a barrier net (38) separating the first cargo portion (24) from the second cargo portion (26). The first cargo portion (24) comprises a cargo-receiving zone (40) and a stay-out zone (44) in which cargo is not permitted. The barrier net (38) is configured to distend into the first cargo portion (24) when restraining forward movement of cargo (48) in the second cargo portion due to the cargo (48) in the second cargo portion being subjected to an acceleration relative to the cabin. At least part of the distension of the
(Continued)

barrier net (38) is accommodated by the stay-out zone (44) of the first cargo portion (24).

13 Claims, 7 Drawing Sheets (51) Int. Cl.
| | |
|---|---|
| *B64C 1/10* | (2006.01) |
| *B60P 7/18* | (2006.01) |
| *B62D 25/20* | (2006.01) |
| *B60P 7/16* | (2006.01) |
| *B64C 1/20* | (2006.01) |
| *B60P 7/10* | (2006.01) |
| *B60P 7/14* | (2006.01) |
| *B62D 33/04* | (2006.01) |
| *B62D 33/02* | (2006.01) |
| *B64D 11/00* | (2006.01) |

(52) U.S. Cl.
CPC .................. *B60P 7/16* (2013.01); *B60P 7/18* (2013.01); *B62D 25/2054* (2013.01); *B62D 33/02* (2013.01); *B62D 33/0207* (2013.01); *B62D 33/04* (2013.01); *B62D 33/042* (2013.01); *B64C 1/10* (2013.01); *B64C 1/20* (2013.01); *B64D 9/00* (2013.01); *B60P 7/0807* (2013.01); *B64D 11/0023* (2013.01)

(58) Field of Classification Search
CPC .... B62D 33/042; B62D 33/02; B62D 25/087; B62D 25/2054; B60P 7/18; B60P 7/16; B60P 7/10; B60P 7/14; B60P 7/0876; B60P 7/0807; B64C 1/20; B64C 1/10; Y02T 50/46
USPC ................ 410/117, 118, 121, 129, 130, 140; 244/118.1, 137.1
See application file for complete search history.

(56) References Cited

U.S. PATENT DOCUMENTS

| | | |
|---|---|---|
| 6,010,286 A | 1/2000 | Cross et al. |
| 6,435,786 B1 | 8/2002 | Breckel et al. |
| 7,258,303 B2 | 8/2007 | Bouchet et al. |
| 7,347,399 B2 | 3/2008 | Bouchet et al. |
| 8,475,097 B2 * | 7/2013 | Ackerman ............ B60P 7/0876 410/118 |
| 8,545,149 B2 | 10/2013 | Helmner et al. |
| 2010/0178129 A1 * | 7/2010 | Helmner ............... B60P 7/0876 410/118 |

FOREIGN PATENT DOCUMENTS

| | | |
|---|---|---|
| EP | 1533226 A1 | 5/2005 |
| EP | 2134600 B1 | 2/2012 |
| GB | 2364983 A | 2/2002 |

OTHER PUBLICATIONS

English translation of European patent document No. EP 2134600 dated Feb. 29, 2012, https://patents.google.com/patent/EP2134600B1/en?oq=EP2134600, accessed on May 29, 2018.
English translation of European patent document No. EP 1533226 dated May 25, 2005, https://patents.google.com/patent/EP1533226A1/en?oq=EP1533226A1, accessed on May 29, 2018.
English translation of German patent document No. DE 2913050 dated Oct. 2, 1980, https://www65.orbit.com/?locale=en&ticket=2d7360e8-fac4-444a-a89d-e9af8723385b&embedded=false#PatentDocumentPage, accessed on May 29, 2018.
English translation of European patent document No. EP 0354403 dated Feb. 14, 1990, https://patents.google.com/patent/EP0354403A2/en?oq=EP0354403A2, accessed on May 29, 2018.
Ancra International, Aircraft Interiors Specialty Hardward, Catalog 403, www.ancra.com, accessed on Nov. 16, 2015.
Cargo Systems Incorporated, Cargo Systems Aircraft Cargo Barrier Nets from Cargo Systems Inc., http://www.cargosystems.com, accessed on Nov. 16, 2015.
Bombardier Inc., Q400 | Modular interior—Commercial Aircraft—Bombardier, http://commercialaircraft.bombardier.com/en/q400/Flexibility/Adaptable-Modular-Interio . . . , accessed on Nov. 16, 2015.
Worldwide Aircraft Services, Inc., EMB-120 Cargo Conversion, STC #ST00598WI, 2000, WASI Publication, USA.

* cited by examiner

MOBILE PLATFORM CABIN CONFIGURED FOR PASSENGER AND CARGO TRANSPORT

CROSS-REFERENCE TO RELATED APPLICATION(S)

This Patent application is a national phase application under 35 U.S.C. 371 of International Patent Application No. PCT/162016/057140 filed on Nov. 25, 2016, which claims priority from U.S. Provisional Patent Application Ser. No. 62/263,243 filed on Dec. 4, 2015, the entire content of which is incorporated herein by reference.

TECHNICAL FIELD

The disclosure relates generally to cabins of mobile platforms, and more particularly to mobile platform cabin configurations for transporting both passengers and cargo.

BACKGROUND OF THE ART

Multi-purpose aircraft (often called "combi" aircraft) in commercial aviation are aircraft that can be used to carry both passengers as an airliner and cargo as a freighter. Such aircraft may have a partition in the aircraft cabin that separate the passenger and cargo portions of the aircraft. The use of a net as a partition to restrain cargo in an aircraft is known. However, the use of such nets can necessitate the allocation of unusable spaces inside the aircraft to allow for net distension and can restrict the revenue-generating area of the aircraft. Improvement is desirable.

SUMMARY

In one aspect, the disclosure describes a cabin of a mobile platform where the cabin is configured for passenger and cargo transport. The cabin comprises:
a passenger portion;
a first cargo portion disposed aft of the passenger portion relative to a longitudinal axis of the cabin, the first cargo portion comprising a cargo-receiving zone and a stay-out zone in which cargo is not permitted, the cargo-receiving zone and the stay-out zone being disposed one after the other along the longitudinal axis of the cabin;
a rigid partition separating the passenger portion from the first cargo portion;
a second cargo portion disposed aft of the first cargo portion; and
a flexible barrier net separating the first cargo portion from the second cargo portion, the barrier net being configured to distend into the first cargo portion when restraining forward movement of cargo in the second cargo portion due to the cargo in the second cargo portion being subjected to an acceleration relative to the cabin, at least part of the distension of the barrier net being accommodated by the stay-out zone of the first cargo portion.

A length of the stay-out zone along the longitudinal axis of the cabin may be configured to accommodate a predetermined maximum distension of the barrier net. The predetermined maximum distension may be based on a maximum weight of the cargo in the second cargo portion subjected to a maximum acceleration. The maximum acceleration may be based on an emergency landing condition of the mobile platform comprising the cabin. The maximum acceleration may be about nine (9) g.

The stay-out zone may comprise two sub stay-out zones where one sub stay-out zone is disposed forward of the cargo-receiving zone and another sub stay-out zone is disposed aft of the cargo-receiving zone.

The stay-out zone may be disposed aft of the cargo-receiving zone.

The cargo-receiving zone of the first cargo portion may comprise two sub cargo-receiving zones separated by an organizational net.

The cargo-receiving zone of the first cargo portion may comprise two sub cargo-receiving zones disposed one after the other along the longitudinal axis of the cabin. The stay-out zone may comprise two sub stay-out zones where a first sub stay-out zone is disposed adjacent a first sub cargo-receiving zone and a second sub stay-out zone is disposed adjacent a second sub cargo-receiving zone.

In some embodiments: the first sub cargo-receiving zone may be disposed forward of the second sub cargo-receiving zone; the first sub stay-out zone may be disposed forward of the first sub cargo-receiving zone; and the second sub stay-out zone may be disposed aft of the second sub cargo-receiving zone.

The first sub cargo-receiving zone and the second sub cargo-receiving zone may be separated by an organizational net.

The partition may comprise a rigid bulkhead.

The first cargo portion may comprise an indication delimiting the cargo-receiving zone.

The first cargo portion may comprise an indication delimiting the stay-out zone.

The flexible barrier net may be configured to exhibit a predetermined minimum distension under a predetermined force along the longitudinal axis of the cabin. The predetermined minimum distension of the flexible barrier net may be correlated to a predetermined maximum load transferred to a structure (e.g., fuselage) of the mobile platform by the flexible barrier net under the predetermined force. The maximum load transferred to the structure (e.g., fuselage) of the mobile platform may be a maximum radially inward force relative to the longitudinal axis of the cabin.

Embodiments may include combinations of the above features.

In another aspect, the disclosure describes a cabin of a mobile platform where the cabin is configured for passenger and cargo transport. The cabin comprises:
a first cargo portion comprising a cargo-receiving zone and a stay-out zone in which cargo is not permitted, the cargo-receiving zone and the stay-out zone being disposed one after the other along a longitudinal axis of the cabin;
a second cargo portion disposed aft of the first cargo portion; and
a barrier net separating the first cargo portion from the second cargo portion, the barrier net being configured to distend into the first cargo portion when restraining forward movement of cargo in the second cargo portion due to the cargo in the second cargo portion being subjected to an acceleration relative to the cabin; wherein:
a predetermined maximum distension of the barrier net is configured not to exceed a length of the stay-out zone along the longitudinal axis of the cabin; and
a predetermined minimum distension of the barrier net under a predetermined force along the longitudinal axis of the cabin is correlated to a predetermined maximum load transferred to a structure of the mobile platform by the barrier net under the predetermined force.

The predetermined maximum distension of the barrier net may be based on a maximum weight of the cargo in the second cargo portion subjected to a maximum acceleration.

The predetermined force may be based on a maximum weight of the cargo in the second cargo portion subjected to a maximum acceleration.

Embodiments may include combinations of the above features.

In another aspect, the disclosure describes an aircraft comprising a cabin as disclosed herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to mobile platforms such as aircraft that can be used to transport passengers as an airliner and also cargo as a freighter. Such aircraft that can carry a mixed passenger/cargo combination are sometimes referred to as "combi" aircraft. In particular, the present disclosure relates to configurations of mobile platform cabins suitable for transporting both passengers and cargo. Even though the disclosure refers to aircraft as exemplary mobile platforms, aspects of the disclosure are not intended to be limited to aircraft use. It is understood that aspects of the present disclosure may also apply to other mobile platforms such as trains, busses, ships and other watercraft for example.

In various embodiments, the present disclosure relates to cabin configurations where the cargo portion of the cabin is located aft of the passenger portion of the cabin and where a relatively rigid bulkhead serves as a partition separating the passenger portion from the cargo portion. The use of one or more stay-out zones in combination with one or more flexible barrier nets in the cargo portion to restrain forward movement of some of the cargo in the event of an emergency landing for example, can reduce the amount of forward loading that the rigid bulkhead must be designed to withstand. This may allow for a relatively lightweight bulkhead that can be repositioned to other locations within the cabin without increasing the capacity of the rigid bulkhead. A stay-out zone may be designed to accommodate at least some distension of an associated barrier net. In some embodiments, the stay-out zone may be designed to accommodate a predetermined maximum distension of the barrier net.

In some embodiments, a minimum distension of a barrier net may be predetermined and selected to limit the loading of the structure of the mobile platform. For example, in the case of a barrier net having a spider web configuration being secured in an aircraft cabin, the minimum distension required of the barrier net under a predetermined (e.g., maximum) load may be selected in consideration of associated radially inward forces being exerted on the airframe under such minimum distension.

In various embodiments, the present disclosure relates to the interaction of a relative rigid partition and a relatively flexible barrier net in the prevention of cargo from entering a passenger portion of a cabin of a mobile platform in an emergency landing condition (i.e., up to a 9 g forward acceleration of a cargo payload located aft of the passenger portion of the cabin of an aircraft). Accordingly, aspects of the present disclosure may facilitate the development of efficient cabin configurations (e.g., reduced weight, reduced cost, increased payload) through the interaction between a relatively flexible cargo barrier (e.g., net) and a relatively rigid cargo barrier (e.g., partition).

Aspects of the various embodiments are described through reference to the drawings.

Figure 1:
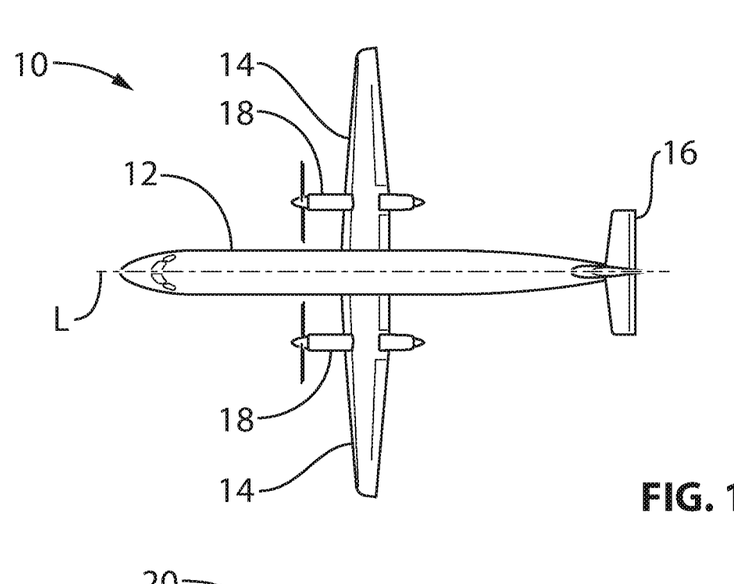
FIG. 1 shows a top plan view of an exemplary aircraft comprising a cabin configured to transport both passengers and cargo.

FIG. 1 shows a top plan view of an exemplary mobile platform (e.g., aircraft 10) comprising a cabin configuration as disclosed herein for transporting both passengers and cargo. Aircraft 10 may be a fixed-wing aircraft. Aircraft 10 may be any known or other suitable aircraft such as corporate, private or commercial aircraft. For example, aircraft 10 may be a twin-engine turboprop airliner. Since aircraft 10 may be configured for mixed use, namely designed to transport both passengers and cargo (i.e., freight), aircraft 10 may be of the type known as a "combi" aircraft.

Aircraft 10 may comprise an aircraft structure including fuselage 12, one or more wings 14 and empennage 16. Aircraft 10 may comprise one or more engines 18 mounted to the aircraft structure. In various embodiments of aircraft 10, engine(s) 18 may be mounted to wings 14 and/or to fuselage 12.

Figure 2:
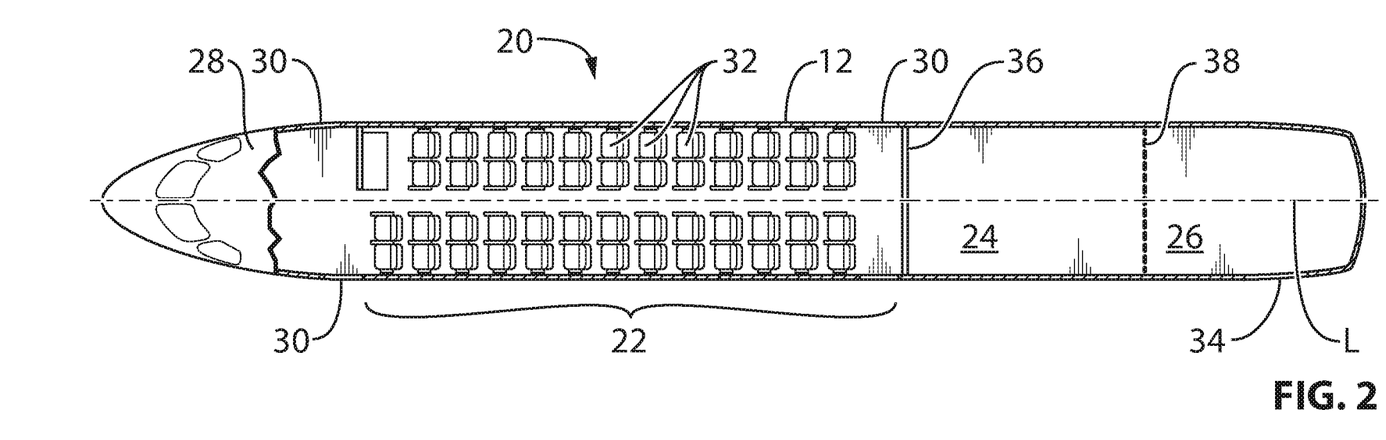
FIG. 2 shows an enlarged top plan view of an exemplary configuration of the cabin of the aircraft of FIG. 1.

FIG. 2 shows an enlarged top plan view of cabin 20 of aircraft 10. Cabin 20 may comprise passenger portion 22 and one or more cargo portions 24, 26 within a cargo bay disposed aft of passenger portion 22 relative to longitudinal axis L of cabin 20. Longitudinal axis L may also be the same longitudinal axis L of aircraft 10 shown in FIG. 1. Passenger portion 22 may be disposed aft of cockpit 28 of aircraft 10. Passenger portion 22 of cabin 20 may comprise one or more passenger doors 30 allowing passenger access to/from passenger portion 22. Passenger portion 22 may also comprise a plurality of passenger seats 32 provided therein. Cargo portions 24, 26 of cabin 20 may comprise one or more cargo doors 34 allowing access to cargo portions 24, 26 of the cargo bay.

Cargo portions 24, 26 may comprise first cargo portion 24 disposed aft of passenger portion 22 and second cargo portion 26 disposed aft of first cargo portion 24. Passenger portion 22 and first cargo portion 24 may be separated by partition 36. Partition 36 may comprise a relatively rigid bulkhead of known or other construction extending vertically and transversely inside cabin 20. First cargo portion 24 and second cargo portion 26 may be separated by barrier net 38 of known or other type. Barrier net 38 may be of the type known as "divider net", "main deck barrier net" or "spider net" for example. Barrier net 38 may have a relatively flexible construction relative to partition 36 and allowed to distend in order to reach its maximum load carrying capability. In various embodiments, barrier net 38 may have a spider web configuration or a rectangular mesh configuration for example.

Figure 3A:
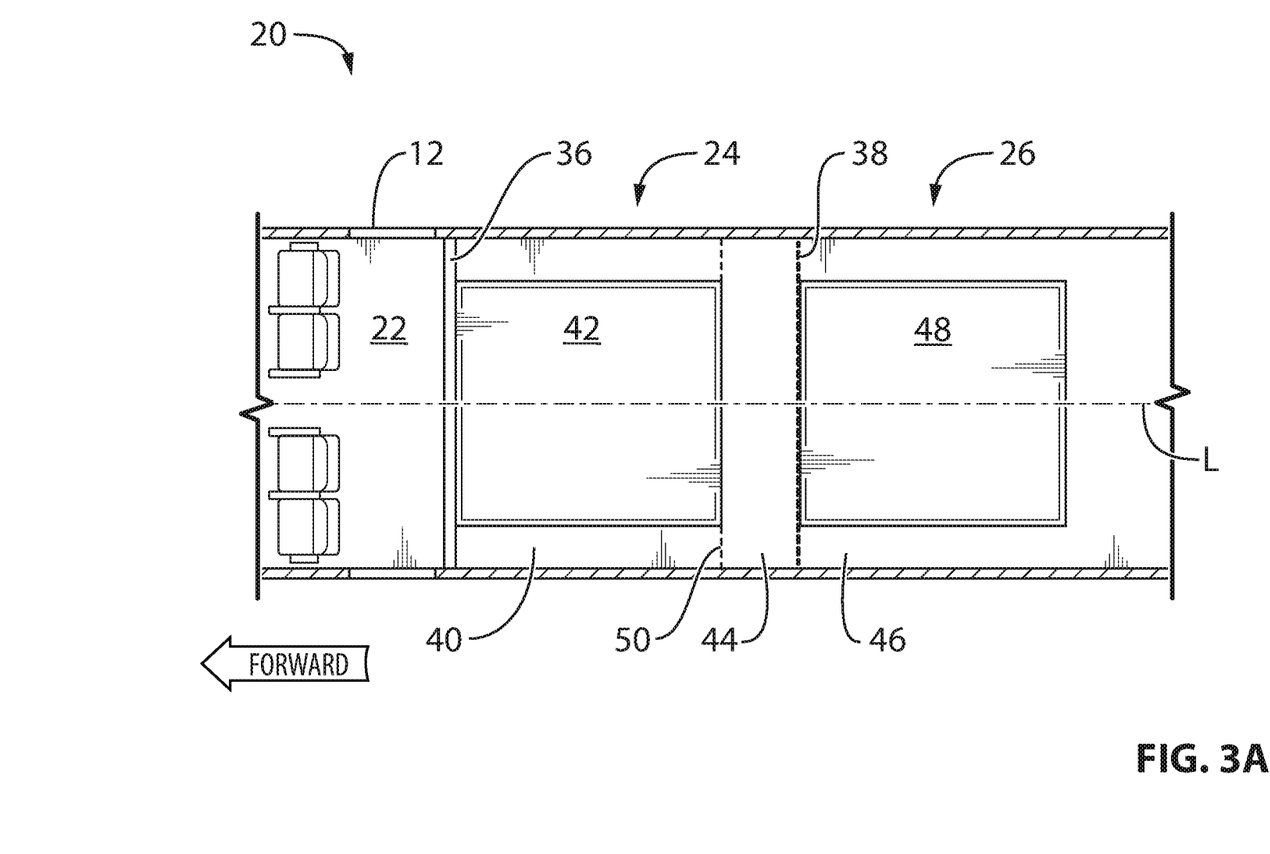
FIGS. 3A and 3B show a partial schematic representation of an exemplary configuration of the cabin of FIG. 2 including a barrier net in an undistended state and in a distended state respectively.
Figure 3B:
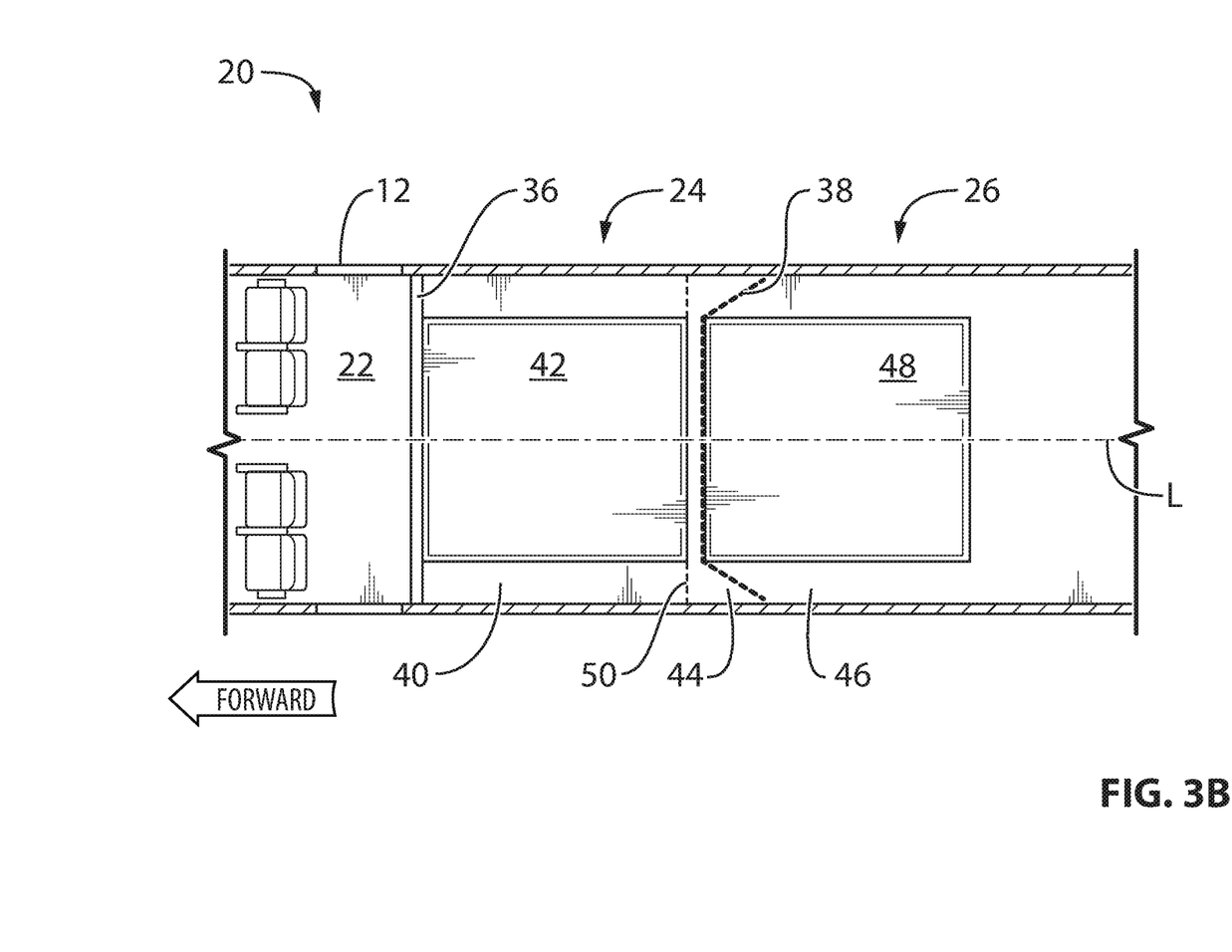

FIGS. 3A and 3B show a partial schematic representation of an exemplary configuration of cabin 20 for transporting both passengers and cargo where barrier net 38 is shown in an undistended state in FIG. 3A and in a distended state in FIG. 3B. First cargo portion 24 may be disposed aft of passenger portion 22 relative to longitudinal axis L of cabin 20. First cargo portion 24 may comprising one or more cargo-receiving zones 40 (hereinafter "cargo-receiving zone 40") inside which cargo 42 may be loaded for transport by aircraft 10. In some embodiments, cargo-receiving zone 40 may have a width that spans across most or substantially all of the width of the inside of cabin 20 and may have a length that extends in the direction of longitudinal axis L of cabin 20. First cargo portion 24 may also comprise one or more stay-out zones 44 (hereinafter "stay-out zone 44") inside which it is not permitted to load cargo. In some embodiments, stay-out zone 44 may have a width that spans across most or substantially all of the width of the inside of cabin 20 and may have a length that extends in the direction of longitudinal axis L of cabin 20. In some embodiments, the length of cargo-receiving zone 40 may be greater than the length of stay-out zone 44.

Cargo-receiving zone 40 and stay-out zone 44 may be disposed one after the other along longitudinal axis L of cabin 20. In other words, cargo-receiving zone 40 and stay-out zone 44 may comprise transverse slices of space along cabin 20. In the exemplary configuration of cabin 20 shown in FIG. 3A, stay-out zone 44 is shown to be disposed aft of cargo-receiving zone 40 but it is understood that stay-out zone 44 or part thereof could be located forward of cargo-receiving zone 40 as explained in more detail below. Second cargo portion 26 may comprise one or more cargo-receiving zones 46 (hereinafter "cargo-receiving zone 46") inside which cargo 48 may be loaded for transport by aircraft 10.

FIGS. 3A and 3B only show two cargo portions 24, 26 for the sake of clarity but it is understood that one or more additional cargo portion(s) could be disposed aft of second cargo portion 26 depending on the size (e.g., length along longitudinal axis L) of the portion(s) of cabin 20 dedicated to cargo transport. Such additional cargo portion(s) could for example comprise cargo-receiving zones as described herein and be separated by additional barrier net(s) such as barrier net 38. In the case where additional aft cargo portion(s) would be present and separated by similar barrier net(s) 38 having similar or lesser maximum distensions, additional substantial stay-out zone(s) may not be required in such additional aft cargo portion(s) since the distension of barrier 38 caused by the forward movement of cargo 48 would then provide (e.g., free-up) space for the distension of one or more additional aft barrier nets in a domino effect. However, in some embodiments, it might be desirable to provide some stay-out zones in such additional aft cargo portions to ensure that a forward force exerted by cargo in an aft cargo portion is not entirely transferred to a forward cargo portion and consequently that forward forces exerted by cargo in two or more cargo portions is not accumulated on a single barrier net 38 or on rigid partition 36.

The locations of cargo-receiving zones 40, 46 and/or stay-out zone 46 may be indicated by way of one or more visual indications 50 such as markers, arrows, icons, text, symbols and/or lines disposed on the floor and/or the wall(s) inside of cabin 20. Such visual indications 50 may be in the form of one or more adhesively applied decals or may be applied using paint for example. Such indications 50 may be configured to instruct personnel loading cargo in cabin 20 as to where cargo may be placed inside of first cargo portion 24 and/or second cargo portion 26. Alternatively or in addition, such indications 50 may be configured to instruct personnel loading cargo in cabin 20 as to where cargo may be not be placed inside of first cargo portion 24 and/or second cargo portion 26 in order to keep stay-out zone 44 clear (i.e., empty, free of cargo). Accordingly, indication(s) 50 may delimit cargo-receiving zone 40 and/or indication(s) 50 may delimit stay-out zone 44. Other indications may be provided to instruct personnel about a maximum cargo weight that may be loaded into cargo-receiving zones 40 and 46.

Figure 6:
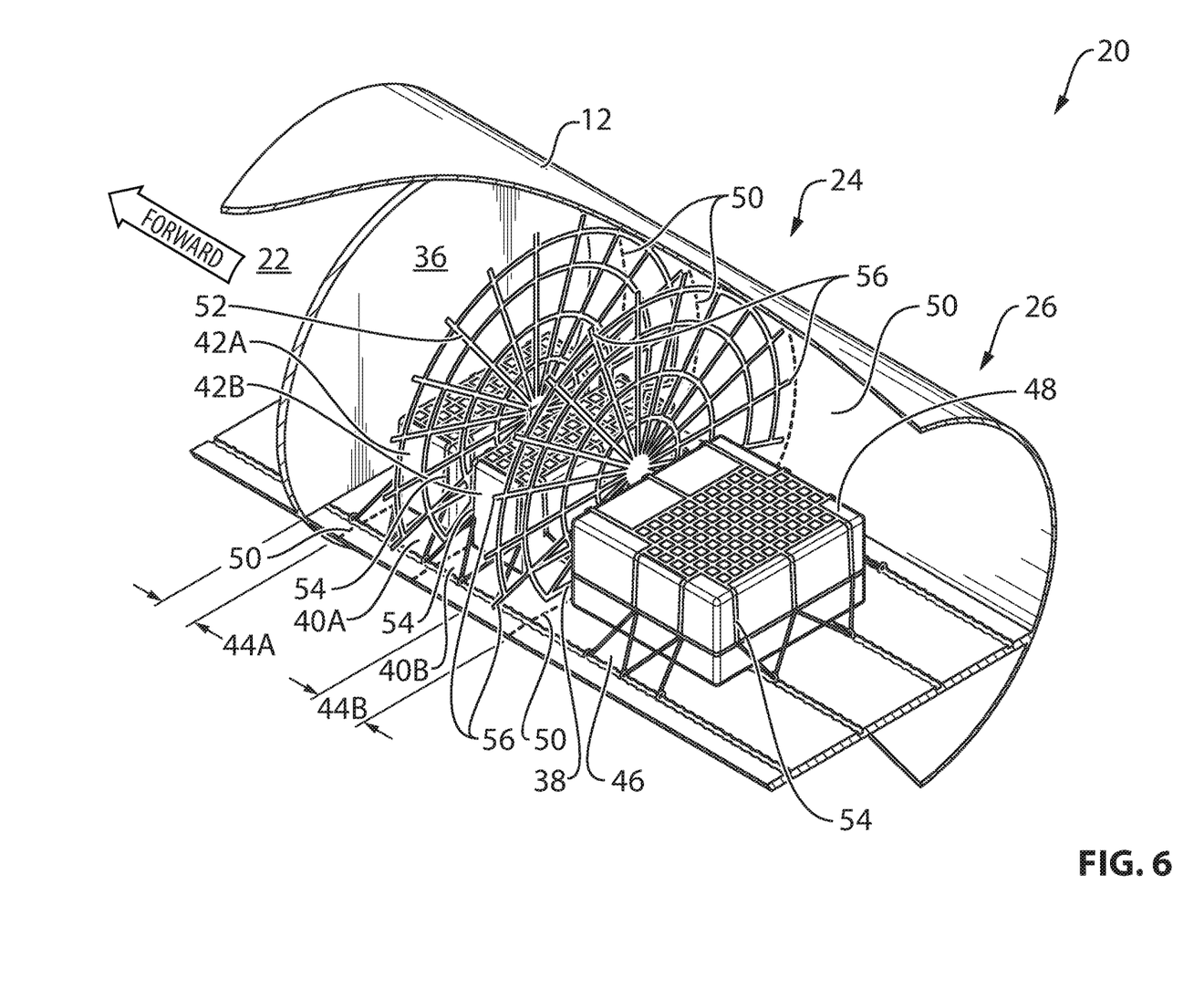
FIG. 6 is a partial perspective view of the cabin configuration of FIG. 5.

Barrier net 38 may extend vertically and transversely inside of cabin 20 in order to separate first cargo portion 24 from second cargo portion 26. Barrier net 38 may have a spider web configuration as shown in FIG. 6 and may be secured inside of cabin 20 at a plurality of attachment locations circumferentially spaced apart about barrier net 38. As explained further below, barrier net 38 may be secured to the structure (e.g., fuselage stringers or frames, seat tracks) of aircraft 10 using anchor plates, block fittings and/or suitable fixtures of known or other types.

Barrier net 38 may be constructed and secured inside of cabin 20 so as to restrain forward movement of cargo 48 located in second cargo portion 26 due to cargo 48 being subjected to an acceleration relative to cabin 20. Such acceleration could potentially be experienced due to normal loads during flight, during landing or braking (e.g., deceleration) or during an emergency landing of aircraft 10. For example, an emergency landing of aircraft 10 could potentially cause an acceleration to be exerted on cargos 42 and 48 and consequently cause cargos 42 and 48 to be urged forward relative to longitudinal axis L of aircraft 10. For example, part 525.561 of the Canadian Aviation Regulations (CARs) specifies accelerations under which cargo must be restrained where the relevant acceleration in the forward direction relative to longitudinal axis L of aircraft 10 is up to nine (9) g. In some embodiments, barrier net 38 may be designed to restrain cargo 48 in the event of such acceleration. Similarly, partition 36 (e.g., rigid bulkhead) may be designed to restrain cargo 42 in the event of such acceleration in order to protect passengers in passenger portion 22 by preventing cargo 42 from entering passenger portion 22.

The relative terms "rigid" and "flexible" are used herein to characterize the construction/behaviour of partition 36 and barrier net 38 under the application of a load. The terms "rigid" and "flexible" are not intended to be construed in their absolute sense. For example, it is understood that rigid partition 36 or part(s) thereof may exhibit some degree of flexibility and that flexible barrier net 38 or part(s) thereof may exhibit some degree of rigidity. Accordingly, in the applicable embodiments, rigid partition 36 may be more rigid than flexible barrier net 38, and, flexible barrier net 38 may be more flexible than rigid partition 36.

Due to the relative flexibility of barrier net 38, the forward force applied to barrier net 38 by cargo 48 in the event of an emergency landing for example may cause barrier net 38 to stretch and become distended toward the forward direction relative to longitudinal axis L of cabin 20 as shown in FIG. 3B. This forward distension may cause part of barrier net 38 to be displaced into first cargo portion 24. However, the presence of stay-out zone 44 may accommodate at least some of the distension of barrier net 38 so that at least some of the forward force exerted by cargo 48 is transferred to the structure of aircraft 10 via barrier net 38 instead of being transferred onto cargo 42 and consequently accumulated onto partition 36. The use of stay-out zone 44 for accommodating at least some of the distension of barrier net 38 may prevent the accumulation of forward force exerted by both cargo 42 and cargo 48 onto partition 36 and thereby prevent the overloading of partition 36. Accordingly, partition 36 may be designed to withstand the forward force exerted by cargo 42 that is located forward of barrier net 38 but not necessarily designed to withstand the accumulation of forward force exerted by the entire cargo payload (e.g., cargo 42, cargo 48 and optionally one or more other cargos disposed aft of second cargo portion 26). In other words, stay-out zone 44 may provide breathing room for barrier net 38 so that a forward force exerted by cargo 48 is not transferred onto cargo 42 and subsequently onto partition 36.

In some embodiments, the use of rigid partition 36 in combination with one or more barrier nets 38 may result in weight savings associated with the construction of partition 36 in comparison with otherwise needing to have partition 36 designed to withstand much higher forward forces. Also, due to the relatively rigid construction of partition 36, no significant stay-out zone taking away revenue-generating space inside of cabin 20 may be required forward of partition 36. Furthermore, the use of rigid partition 36 for separating passenger cabin 22 from cargo portion 24 may provide a more esthetically pleasing appearance from within passenger cabin 22 as opposed to using a barrier net instead of rigid partition 36.

A length of the stay-out zone 44 along the longitudinal axis L of cabin 20 may be determined based on a predicted amount of distension of barrier net 38 desired to be accommodated in order to reduce or completely eliminate the amount of forward force transferred from cargo 48 to cargo 42. In some embodiments, the length of stay-out zone 44 may be selected to accommodate less than the predetermined maximum distension of barrier net 38 and therefore allow some forward force to be transferred from cargo 48 to cargo 42 when the distension of barrier net 38 exceeds the accommodation (i.e., length) provided by stay-out zone 44. Alternatively, the length of stay-out zone 44 may be selected to accommodate the entire maximum predetermined distension of barrier net 38 in order to substantially prevent any forward force from being transferred from cargo 48 to cargo 42. In some embodiments, the deformation of partition 36 under such forward loading may be of enough significance to be considered in the selection of the length of stay-out zone 44.

In some embodiments, the predetermined maximum distension of barrier net 38 may be based on a maximum weight of cargo 48 allowable in second cargo portion 26 being subjected to a maximum predetermined acceleration. In some embodiments, the maximum predetermined acceleration may be that expected in an emergency landing of a mobile platform comprising cabin 20. In the case of an emergency landing of an aircraft comprising cabin 20, the maximum predetermined acceleration of cargo 42 and cargo 48 for which rigid partition 36 and barrier net 38 may be certified may be about nine (9) g. Accordingly, rigid partition 36 and barrier net 38 may be designed to withstand such respective loads from cargo 42 and cargo 48.

The flexibility and predetermined minimum distension of barrier net 38 may be selected taking into consideration the amount and nature of the loads transferred into the structure of aircraft 10 by barrier net 38. For example, a barrier net 38 that is relatively taut in an unloaded/undistended state and having a less flexible construction may cause relatively high and undesirable radial (i.e., inward) loads to be transferred onto the structure (e.g., fuselage 12) of aircraft 10. On the other hand, a looser and more flexible barrier net 38 may cause lower and hence more desirable radial loads to be transferred onto the structure of aircraft 10. Accordingly, the predetermined minimum distension of barrier net 38 under a predetermined (e.g., maximum) load may be selected in order to reduce or eliminate the need for additional reinforcement (and weight) in the structure of aircraft 10 to withstand loads transferred from barrier net 38. In some embodiments, barrier net 38 may be designed to exhibit a minimum distension under a predetermined load that is large enough to avoid the transfer of undesirable loads to the structure of aircraft 10 but small enough to avoid significantly impacting the available payload space via oversized stay-out zones. In some embodiments, barrier net 38 may be configured to exhibit a predetermined minimum distension under a predetermined force where the predetermined minimum distension of barrier net 38 is correlated to a predetermined maximum (e.g., radial) load transferred to the structure of aircraft 10 by barrier net 38 under such predetermined force. In some embodiments, barrier net 38 may have both a predetermined maximum distension where at least a portion of which is accommodated by stay-out zone 44, and, a predetermined minimum distension that avoids the transfer of undesirable radial loads to the structure of aircraft 10. For example, a barrier net having a nominal radius of about 4 feet may be designed to exhibit a forward distension (i.e., displacement) of about 14±1 inches under a predetermined (e.g., maximum) load where 13 inches would be the minimum distension required to avoid undesirable radially inward forces being transferred into fuselage 12 and 15 inches would be the maximum distension to be accommodated by stay-out zone 44.

Figure 4:
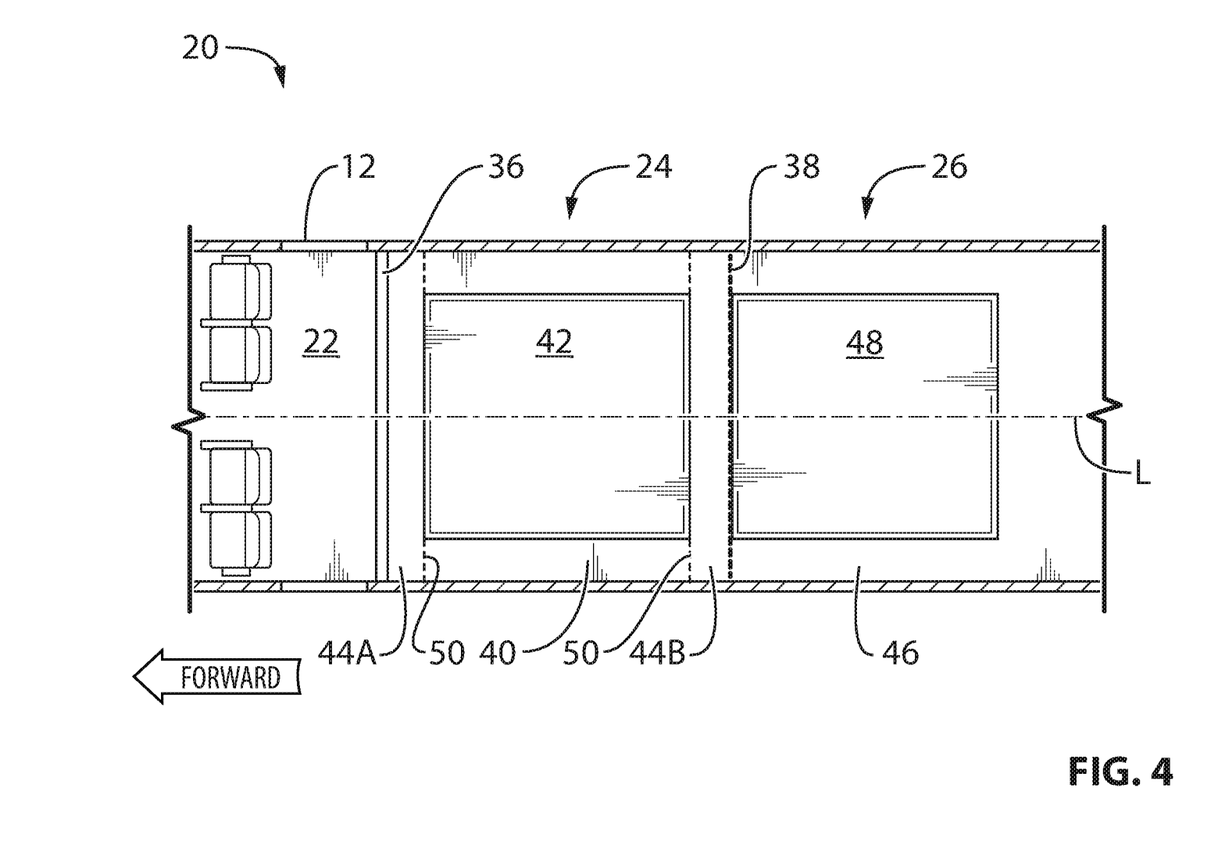
FIG. 4 is a partial schematic representation of another exemplary configuration of the cabin of FIG. 2.

FIG. 4 is a partial schematic representation of another exemplary configuration of cabin 20. In comparison with FIG. 3A, the configuration of FIG. 4 illustrates that stay-out zone 44 of first cargo portion 24 may be divided in two or more sub stay-out zones 44A, 44B where one (e.g., first) sub stay-out zone 44A is disposed forward of cargo-receiving zone 40 and another (e.g., second) sub stay-out zone 44B is disposed aft of the cargo-receiving zone. With respect to accommodating the distension of barrier net 38, the use of two sub stay-out zones 44A, 44B as shown in FIG. 4 may be substantially functionally equivalent to the single stay-out zone 44 of FIG. 3A. In some embodiments, the sum of the lengths of sub stay-out zones 44A and 44B along longitudinal axis L may be substantially the same as the length of the single stay-out zone 44 of FIG. 3A along longitudinal axis L. For example, the length of each of sub stay-out zones 44A and 44B along longitudinal axis L may be about half the length of the single stay-out zone 44 of FIG. 3A. Therefore, in the event of an acceleration causing forward movement or cargo 42 and cargo 48, cargo 42 would move forward against partition 36 and cargo 48 would also move forward to cause distension of barrier net 38 to thereby reproduce the situation depicted in FIG. 3B. Nevertheless, the use of two sub stay-out zones 44A, 44B instead of a single stay-out zone 44 may have some advantages associated with facilitating loading and unloading cargo 42 and also with the installation of floor-to-floor nets (see item 54 in FIG. 6) that may be used to restrain movement of cargo 42.

Figure 5:
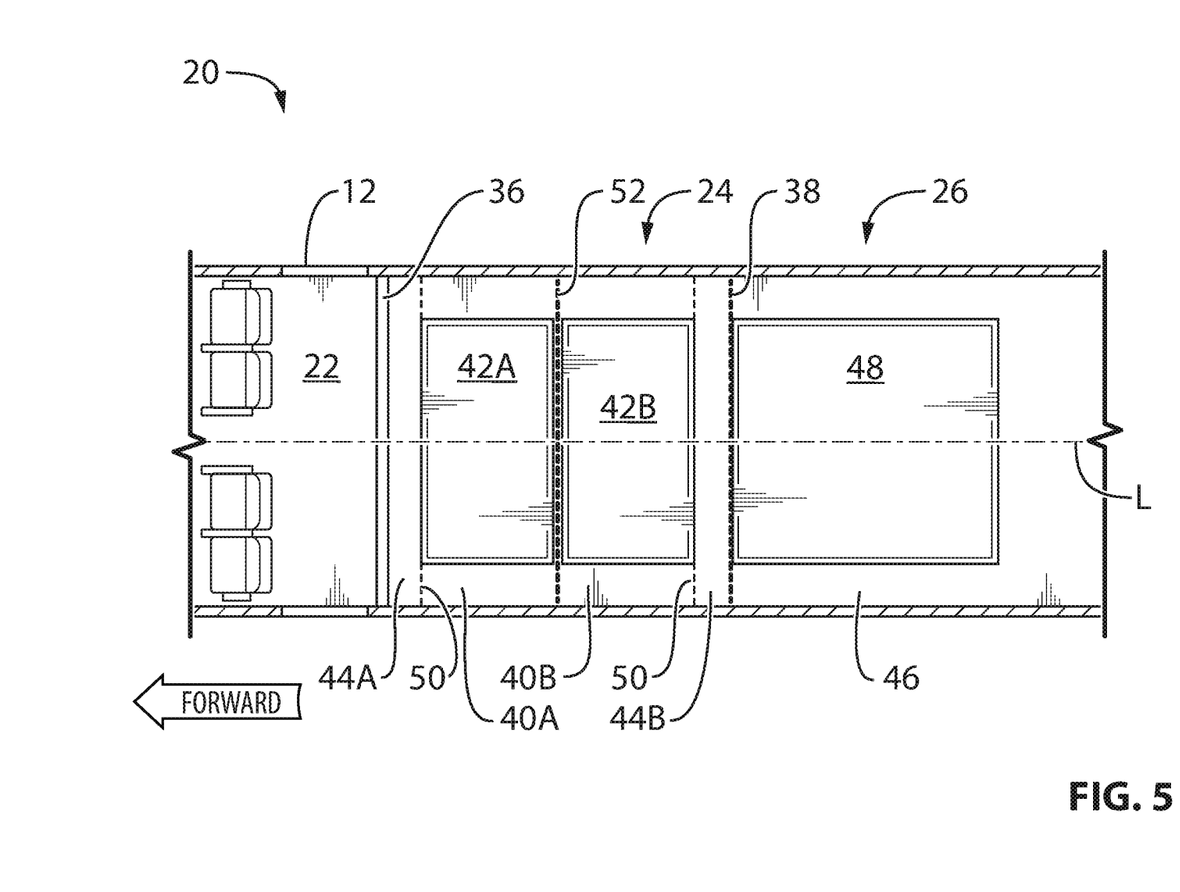
FIG. 5 is a partial schematic representation of another exemplary configuration of the cabin of FIG. 2.

FIG. 5 is a partial schematic representation of another exemplary configuration of cabin 20. In comparison with FIG. 4, the configuration of FIG. 5 illustrates that cargo-receiving zone 40 of first cargo portion 24 may comprise two or more sub cargo-receiving zones 40A, 40B separated by organizational net 52. Organizational net 52 may be used to facilitate loading of cargo 42A, 42B into first cargo zone 24 by facilitating the distribution of weight inside of first cargo zone 24. The use of organizational net 52 may divide first cargo portion 24 into two sub cargo portions. Also, the combination of organizational net 52 with the use of sub stay-out zone 44A forward of cargo 42A in sub cargo-receiving zone 40A, and, sub stay-out zone 44B aft of cargo 42B in sub cargo-receiving zone 40B may cause the two sub cargo zones to have similar loading capacities so as to facilitate loading of first cargo portion 24 as opposed to having a single longer stay-out zone 44 disposed between cargo 42B and barrier net 38.

In some embodiments, organizational net 52 may be intended to mainly serve to organize the placement of cargo in first cargo portion 24 and may not necessarily provide the same level of restraint as barrier net 38. For example, in some embodiments, organizational net 52 may not be considered as providing significant resistance to forward movement of cargo 42B during an emergency landing condition for example. Alternatively, in some embodiments, organizational net 52 could be of a type (e.g., like barrier net 38) providing significant resistance to forward movement of cargo 42B.

Each sub cargo-receiving zone 40A, 40B may comprise a transverse slice of cargo-receiving zone 40 shown in FIG. 4 and may therefore be disposed one after the other along longitudinal axis L of cabin 20. Accordingly, sub cargo-receiving zone 40A may be disposed forward of sub cargo-receiving zone 40B. Instead of a single stay-out zone 44, sub stay-out zone 44A may be disposed adjacent sub cargo-receiving zone 40A and sub stay-out zone 44B may be disposed adjacent sub cargo-receiving zone 40B. Sub stay-out zone 44A may be disposed forward of sub cargo-receiving zone 40A. Sub stay-out zone 44B may be disposed aft of sub cargo-receiving zone 40B.

FIG. 6 is a partial perspective view of the cabin configuration of FIG. 5 showing an exemplary spider web configuration of both barrier net 38 and organizational net 52. As explained above, barrier net 38 may be secured to the structure of aircraft 10 at a plurality of attachment points 56 spaced apart about the circumference of barrier net 38. Also, indications 50 may be disposed on the floor and/or on the wall(s) of the interior of cabin 20 to as to be visible to personnel loading cargo into cabin 20. One or more floor-to-floor nets 54, sometimes called "tie-down" nets, may also be used to further secure cargo 42A, 42B and/or 48.

Figure 7:
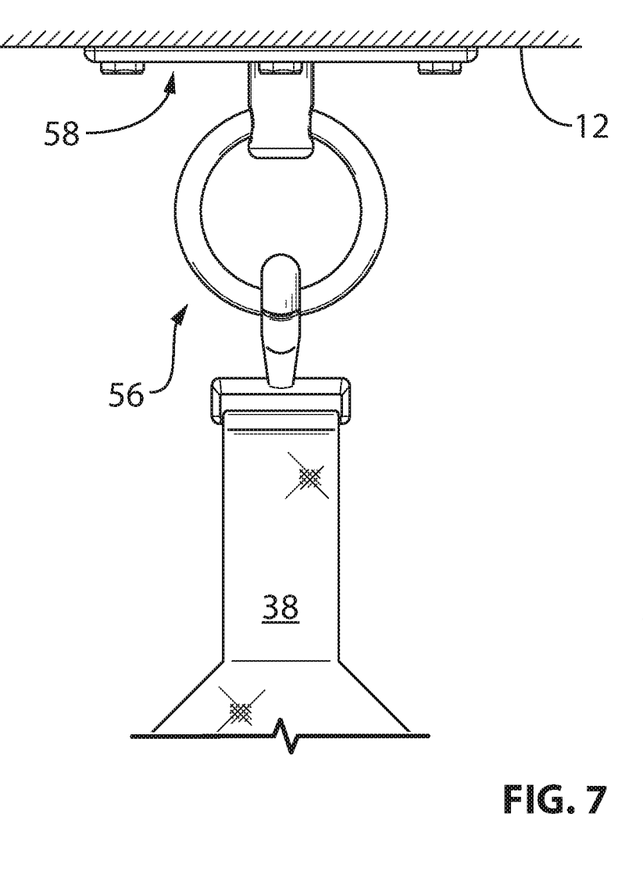
FIG. 7 is a perspective view of an exemplary fixture for securing the barrier net inside the cabin of FIG. 2.

FIG. 7 is a perspective view of an exemplary fixture 58 for securing barrier net 38 inside of cabin 20. Fixture 58 may be configured to permit the securing of an upper or lateral attachment point 56 of barrier net 38 to a wall inside of cabin 20. For example, fixture 58 may be configured to transfer loads from barrier net 38 onto one or more stringers and/or one or more frames of fuselage 12 of aircraft 10.

Figure 8:
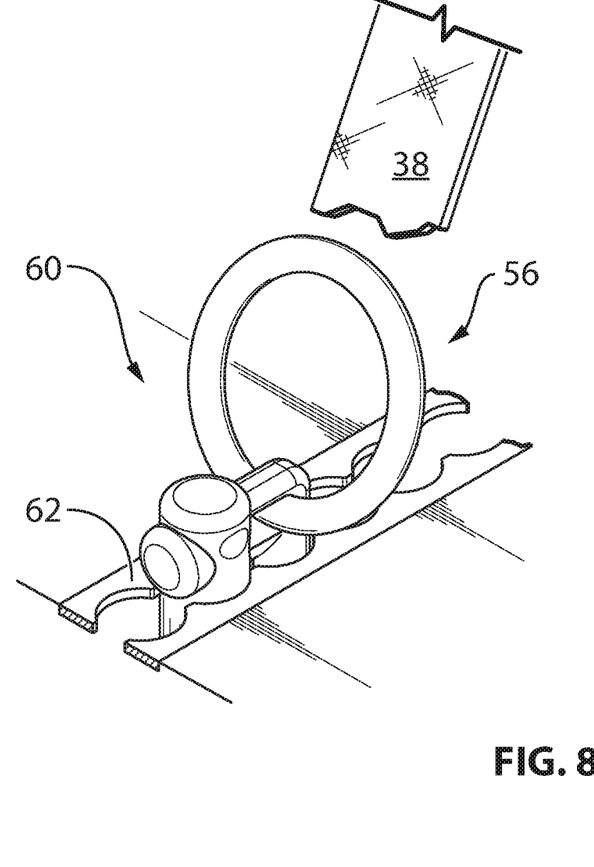
FIG. 8 is a perspective view of another exemplary fixture for securing the barrier net inside the cabin of FIG. 2.

FIG. 8 is a perspective view of another exemplary fixture 60 for securing barrier net 38 inside of cabin 20. Fixture 60 may be configured to permit the securing of a lower attachment point 56 of barrier net 38 to a floor inside of cabin 20. For example, fixture 60 may be configured to transfer loads from barrier net 38 onto seat rail 62 of the type normally used to secure passenger seats 32 to a floor of a passenger portion 22 of an aircraft cabin 20.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the cabins and associated components disclosed and shown herein may comprise a specific number of elements, the cabins and associated components could be modified to include additional or fewer of such elements. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A cabin of a mobile platform, the cabin being configured for passenger and cargo transport, the cabin comprising:
   a passenger portion;
   a first cargo portion disposed aft of the passenger portion relative to a longitudinal axis of the cabin, the first cargo portion comprising a cargo-receiving zone and a first stay-out zone in which cargo is not permitted, the cargo-receiving zone and the stay-out zone being disposed one after the other along the longitudinal axis of the cabin with the stay-out zone disposed aft of the cargo-receiving zone;
   visual indications on an interior of the cabin in the first cargo portion between the stay-out zone and the cargo-receiving zone to delimit the stay-out zone from the cargo-receiving zone;
   a floor to floor net in the cargo-receiving zone for restraining cargo in the first cargo portion;
   a rigid partition separating the passenger portion from the first cargo portion;
   a second cargo portion disposed aft of the first cargo portion; and
   a flexible barrier net separating the first cargo portion from the second cargo portion, the barrier net being configured to distend into the first cargo portion when restraining forward movement of cargo in the second cargo portion due to the cargo in the second cargo portion being subjected to an acceleration relative to the cabin, at least part of the distension of the barrier net being accommodated by the stay-out zone of the first cargo portion.

2. The cabin as defined in claim 1, wherein a length of the stay-out zone along the longitudinal axis of the cabin is configured to accommodate a predetermined maximum distension of the barrier net.

3. The cabin as defined in claim 2, wherein the predetermined maximum distension of the flexible barrier net is based on a maximum weight of the cargo in the second cargo portion subjected to a maximum acceleration.

4. The cabin as defined in claim 3, wherein the maximum acceleration is based on an emergency landing condition of the mobile platform comprising the cabin.

5. The cabin as defined in claim 3, wherein the maximum acceleration is about nine (9) g.

6. The cabin as defined in claim 1, further comprising a further stay-out zone is disposed forward of the cargo-receiving zone.

7. The cabin as defined in claim 1, wherein the cargo-receiving zone of the first cargo portion comprises two sub cargo-receiving zones separated by an organizational net.

8. The cabin as defined in claim 1, wherein:
the cargo-receiving zone of the first cargo portion comprises two sub cargo-receiving zones disposed one after the other along the longitudinal axis of the cabin; and
the first cargo portion comprises a forward stay-out zone disposed adjacent a first of the sub cargo-receiving zones and the first stay-out zone is disposed adjacent a second of the sub cargo-receiving zones.

9. The cabin as defined in claim 8, wherein the first sub cargo-receiving zone and the second sub cargo-receiving zone are separated by an organizational net.

10. The cabin as defined in claim 1, wherein the partition comprises a rigid bulkhead.

11. The cabin as defined in claim 1, wherein the flexible barrier net is configured to exhibit a predetermined minimum distension under a predetermined force along the longitudinal axis of the cabin, the predetermined minimum distension of the flexible barrier net being correlated to a predetermined maximum load transferred to a structure of the mobile platform by the flexible barrier net under the predetermined force.

12. The cabin as defined in claim 11, wherein the maximum load transferred to the structure of the mobile platform is a maximum radially inward force relative to the longitudinal axis of the cabin.

13. An aircraft comprising the cabin as defined in claim 1.

* * * * *